July 1, 1924.

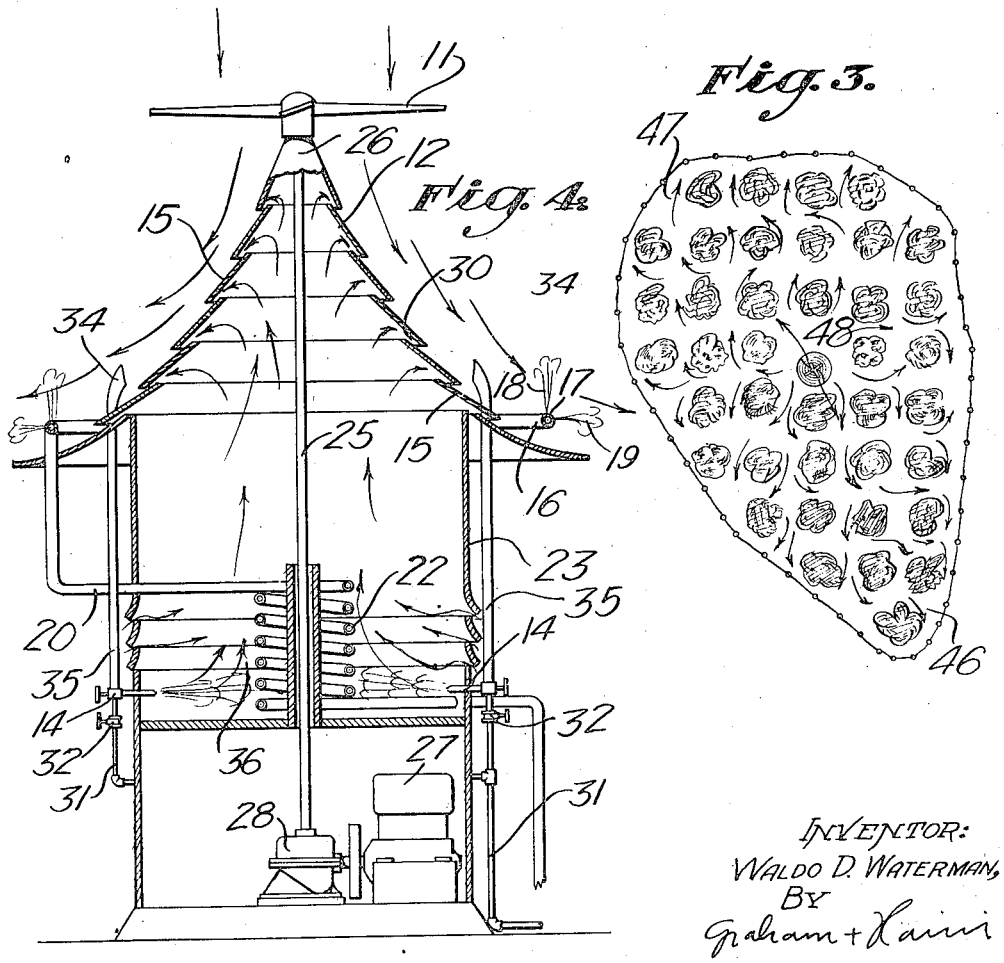

W. D. WATERMAN

AIR CIRCULATOR AND HEATER

Filed July 17, 1922          2 Sheets-Sheet 2

1,499,894

INVENTOR:
WALDO D. WATERMAN,
BY
Graham + Lauin
ATTORNEYS.

Patented July 1, 1924.

1,499,894

UNITED STATES PATENT OFFICE.

WALDO D. WATERMAN, OF LOS ANGELES, CALIFORNIA.

AIR CIRCULATOR AND HEATER.

Application filed July 17, 1922. Serial No. 575,653.

*To all whom it may concern:*

Be it known that I, WALDO D. WATERMAN, a citizen of the United States, residing at Los Angeles, in the county of Los Angeles, State of California, have invented a new and useful Air Circulator and Heater, of which the following is a specification.

This invention relates to the prevention of injury to vegetation due to climatic extremes such as excessive cold or frost, or excessive heat, and relates particularly to a device for circulating air over a prescribed area for the purpose of preventing such injury.

In nearly every agricultural district there are periods in which the vegetation is subjected to either extreme heat or extreme cold. In certain localities the summer heat is sufficiently severe to cause injury to crops, and frosts occur in the winter which must be combatted to prevent additional injury, while in certain other more favored localities these periods may not occur yearly but only occasionally.

For the purpose if illustrating the use of my invention I shall describe it in application to the citrus growing industries which are confined to certain districts in this country. In the California citrus growing districts the climatic conditions are ideal for citrus culture except for short periods in the winter in which frosts of sufficient severity to injure the fruit occur, and in certain years some injury to the trees is sustained by excessive summer heat.

Various methods have been employed to combat the frosts and freezing from which the greatest injury to citrus fruit occurs, one of the most common processes being the use of smudge pots which burn low grade oil, and are placed between the trees whereat they are lighted in case of a drop in temperature indicative of frosts. Although the use of smudge pots has been somewhat successful in combating frosts, the lack of circulation of the heat does not entirely prevent the deposite of frost at certain points in the orchard, and these pots have been found otherwise unsatisfactory owing to their inefficient consuption of fuel and the smudge which injures the appearance of the fruit and is also a nuisance to adjoining communities.

In the event of light frost it has been found that a circulation of air throughout the orchard will prevent the deposit of frost therein and devices have been provided in which intermittent blasts of air are directed through the orchard for the purpose of preventing the settlement of frost upon the trees. In extremely severe weather certain experimenters have employed blasts of heated air which they have circulated above the trees, this not proving entirely satisfactory, owing to the tendency for heated air to rise into the higher air strata, therefore making it difficult to apply the heat thereof at desired points. I have found that overlying strata, at a height approximately sixty feet, is considerably warmer than the air adjacent to the ground, and the employment of this warm air constitutes one of the chief features of my invention.

It is an object of my invention to provide an air circulator which will draw down the warm air from the upper strata and distribute a continuous, even flow of this warm air laterally in each direction over a designated area, and which will be extremely efficient and economical in its operation.

It is also an object of my invention to provide an improved means by which the air handled by the circulator may be heated to combat heavy frosts or severe cold in winter, and means by which this air may be cooled to prevent heat injury during the severe periods of the summer months.

It is a further object of my invention to prevent the rising of heated air which is being circulated by the device by humidifying such heated air to restore the density thereof to that at which it existed at low temperature before being heated.

The specific advantages of my invention and further objects thereof will be made evident hereinafter.

Referring to the drawings which are for illustrative purposes only,

Fig. 1 is an elevational view illustrating an apparatus embodying the features of my invention situated in an orchard of low growing trees, such as citrus trees, which provide little space underneath for the circulation of air.

Fig. 2 is an elevational view at a slightly enlarged scale showing a type of my invention adapted to use in orchards of taller trees.

Fig. 3 is a plan view illustrating the irregularity of area which orchards at times assume, and which must be evenly heated if the conditions hereinbefore set forth are to be successfully combatted.

Fig. 4 is an enlarged section through the circulator shown in Fig. 1.

Figure 5:
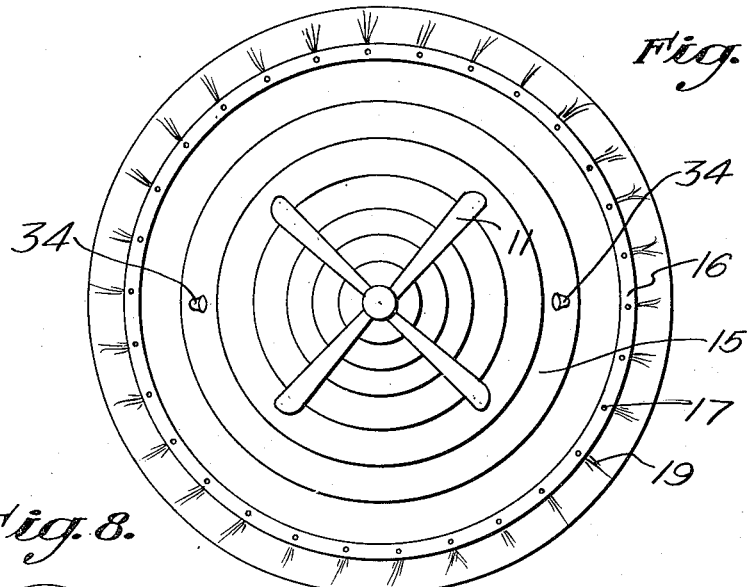
Fig. 5 is a plan view of this circulator.

As shown in the drawings, the circulator 10 of my invention consists in the employment of: a vertically disposed fan 11 which is adapted to downwardly direct a flow or shaft of air; a means for dividing and diverting this downward flow of air into a horizontal flow, this means consisting of a conical member 12 which is mounted centrally beneath the screw 11 so that the shaft of air downwardly directed by the fan will be equally divided; a means for heating the downwardly directed flow of air which consists of a device for intermixing with this flow of air certain quantities of heated air which is supplied from burners 14 and drawn through louvers 15 by the passage of the downwardly directed blast thereacross as this blast is being bent or diverted to a horizontal flow; and means for humidifying the air consisting of a circular steam pipe 16 having holes 17 drilled therein so that jets of steam 18 and 19 are injected into the air, this steam being delivered to the pipe 16 through piping 20 from a heating coil 22 situated within the housing 23, or by any other suitable steam generator.

The fan 11 is of the type employed in aeronautical practice and the blades thereof are of aeroplane propeller contour so that a very efficient driving action upon the air is accomplished. This fan 11 is supported upon the upper end of a vertical shaft 25 extending centrally within the housing 23 and through the peak 26 of the deflector 12, and having as a driving means a motor 27 connected to the shaft 25 through a beveled gear arrangement enclosed in casing 28. The member 12 is comprised of consecutive overlapping louvers 15 providing spaces 30 therebetween through which air from the interior of the housing 23 is drawn due to the vacuum forming action of the current of air driven across the openings 30 by the fan 11. The burners 14 are supplied with fuel oil through piping 31 and valves 32 are provided for regulating the flow of oil into the burners. Air for accomplishing the atomization of the fuel oil may be supplied to the burners by interposing injector funnels 34 in the path of the stream of air driven by the fan 11 so that a quantity of air will be directed through pipes 35 to the burners to be applied at the nozzles as blasts for vaporizing the fuel oil as it is blown into the combustion chamber 36 provided upon the interior of the housing 23.

In Fig. 1 of the drawing the housing 23 is shown of sufficient height to sustain the deflector 12 above the tops of the trees 38 so that the blast delivered from the fan 11 will be diverted as indicated by the arrows 39 across the tops of the trees.

The humidifying of the circulating air by the injection of steam thereinto causes this air to become sufficiently heavy so that the heated condition thereof will not cause it to rise, as would happen were it not humidified, but will cause it to settle in between the trees of the orchard where it may therein give up its heat in combatting the frosts or extreme cold.

There are certain trees which are susceptible to injury by heat and cold which are tall enough in their growth to provide room for air to be circulated thereunderneath; such a tree as this is the walnut. In Fig. 2 I show an air circulator 12 having a very short housing 23 so that the air will be directed, as indicated by the arrows 40, beneath the trees 41 between which it rises and accomplishes the desired moderation of temperature.

Figure 7:
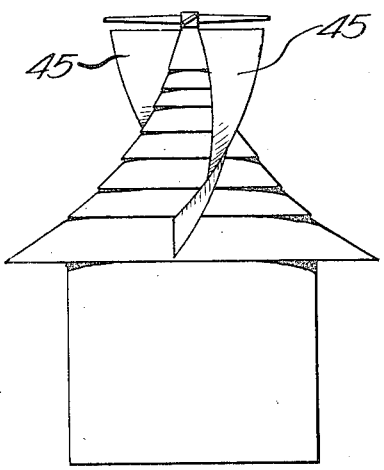
Fig. 7 illustrates the manner in which my invention is equipped to distribute air over an irregular area such as shown in Fig. 3.

The form of my invention shown in Figs. 1 and 2 is particularly adapted to the circulation of air over a circular area. Where an irregular area such as shown in Fig. 3 is encountered, I employ helical vanes 45, as shown in Fig. 7, which divert certain portions of the air stream, which would otherwise be directed into spaces in which it is not desired, into the extreme ends or corners 46 and 47 of the area 48. These vanes 45 may be formed to drive the air to any desired point thereby making it possible to protect irregular areas from the ravages of climatic extremes as well as the protection of substantially regular areas.

Figure 8:
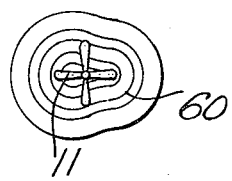
Fig. 8 is a plan view of still another form of deflector adapted to distribute air over an unequal area.
Figure 6:
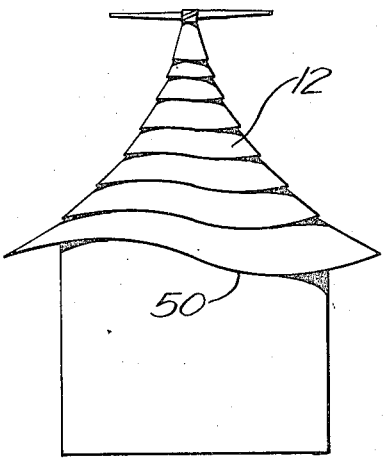
Fig. 6 shows a circulator of my invention adapted to distribute air over an area of irregular contour or elevation.

In Fig. 6 I show a deflector member 12 having the irregular shape shown at 50 which is adapted particularly to use for circulating air over an area having a very irregular contour such as occurs in the foothills which are extensively used for the cultivation of citrus fruits. Instead of the device shown in Fig. 7, it may be desirable to employ a deflector having an irregular outline 60, Fig. 8, for the purpose of directing the air over an irregular area.

The effective distributing action of the device shown and described will be seen to cause the air to flow outwardly in the form of a blanket of warm air over the area being protected. By the term "blanket", the idea of a continuous unbroken layer is intended to be conveyed, which is substantially what the apparatus accomplishes except for the interference of trees.

I claim as my invention:

1. In a temperature moderator for distributing air over an area, the combination of: means for delivering a flow of air normal to said area; and means for deflecting said air outwardly in flat blanket form over said area.

2. In a temperature moderator for distributing air over an area, the combination of: means for delivering a flow of air normal to said area; a deflector for deflecting said air outwardly in blanket form in all directions over said area; and means for heating said air as it is deflected outwardly.

3. In a temperature moderator for distributing air over an area, the combination of: means for delivering a flow of air normal to said area; and means for deflecting said air outwardly in blanket form simultaneously in all directions over said area.

4. In a temperature moderator for distributing air over an area, the combination of: means situated at a sufficient height above the ground to engage warmer air stratum, for delivering a flow of air normal to said area; and means for deflecting said air outwardly in blanket form simultaneously in all directions over said area.

5. In a temperature moderator for circulating air over an area, the combination of: a vertically disposed air screw for downwardly directing a flow of air; and means below said screw for deflecting said air outwardly in all directions in blanket form over said area.

6. In a temperature moderator for circulating air over an area; means for downwardly directing a flow of air; and a conoidal deflector situated beneath said means for diverting said flow of air from the vertical direction, in which it is delivered by said means, to a lateral distribution over said area.

7. In a temperature moderator for circulating air over an area, the combination of: a fan for downwardly directing a flow of air; and means below said screw for deflecting said air outwardly over said area; and a humidifier for imparting moisture to said flow of air.

8. In a temperature moderator for distributing air over an area; the combination of: a fan for downwardly directing a flow of air; and a conoidal deflector disposed in said flow for diverting said flow from the vertical direction to horizontal; and means for imparting heat to said flow of air.

9. In a temperature moderator for distributing air over an area; the combination of: a fan for downwardly directing a flow of air; and a conoidal deflector disposed in said flow for diverting said flow from the vertical direction to horizontal; and means for adding heated air to heat said flow of air.

10. In a temperature moderator for distributing air over an area; the combination of: a fan for downwardly directing a flow of air; and a conoidal deflector disposed in said flow for diverting said flow from the vertical direction to horizontal, said deflector having orifices therein; and means for supplying heated air to the underside of said deflector to be drawn into said flow of air through said orifices.

11. In a device of the class described, the combination of: means for producing a blast of air; a deflector interposed in said shaft, said deflector having orifices therein; and means for supplying a gaseous substance to the underside of said deflector to be drawn through said orifices into said moving air.

12. In a device of the class described, the combination of: means for producing a blast of air; a deflector interposed in said shaft, said deflector having orifices therein; and means for supplying heated air to the underside of said deflector to be drawn through said orifices into said moving air.

13. In a temperature moderator for distributing air over an area; the combination of: a fan for downwardly directing a flow of air; and a conoidal deflector disposed in said flow for diverting said flow from the vertical direction to horizontal, said deflector having orifices therein through which heated air may be drawn into said flow from the underside of said deflector; burners for supplying heat; and air injectors disposed in said flow for delivering an air blast to said burners.

14. In a temperature moderator for distributing air over an area; the combination of: means for producing a flow of air; burners for generating heat; and air injectors disposed in said flow for delivering an air blast to said burners.

15. In a temperature moderator of the class described, the combination of: means for producing a downward flow of air; a deflector for diverting said downward flow into a horizontal flow; and means for heating said flow of air.

16. In a temperature moderator of the class described, the combination of: means for producing a downward flow of air; a deflector for diverting said downward flow into a horizontal flow; and means for changing the heat content of said flow of air as it passes over said deflector.

17. In a temperature moderator of the class described, the combination of: means for producing a downward flow of air; a deflector for diverting said downward flow into a horizontal flow; and means for changing the heat content of said flow of air.

18. In a temperature moderator of the class described, the combination of: means for producing a downward flow of air; a deflector for diverting said downward flow into a horizontal flow; and means for humidifying said flow of air.

19. In a temperature moderator of the class described, the combination of: means for producing a downward flow of air; a deflector for diverting said downward flow into a horizontal flow; and means for humidifying said flow of air as it passes across said deflector.

20. In a temperature moderator of the class described, the combination of: means for producing a downward flow of air; a deflector for diverting said downward flow into a horizontal flow; and means for heating said flow of air as it passes across said deflector.

21. In a temperature moderator of the class described, the combination of: means for producing a flow of air; a deflector for changing the course of said flow of air, said deflector having openings therein; and means for supplying heated air to the back side of said deflector to be drawn through said openings into said flow of air.

22. In a temperature moderator of the class described, the combination of: means for producing a flow of air; a deflector for changing the course of said flow of air, said deflector being comprised of overlapping spaced plates; and means for supplying heated air to the back side of said deflector to be drawn through the space between said overlapping plates into said flow of air.

23. In a temperature moderator of the class described, the combination of: means for producing a flow of air; and a distributor for delivering the air outwardly simultaneously in all directions in a horizontal plane beneath the trees of an orchard.

24. In a temperature moderator of the class described, the combination of: a structure; a conical deflector mounted upon said structure; a vertical drive shaft extending through the apex of said deflector; a fan mounted on the upper end of said shaft; and means for driving said shaft so as to rotate said fan in a direction to deliver a blast of air downwardly against said deflector.

25. In a temperature moderator of the class described, the combination of: a structure; a conical deflector mounted upon said structure, said deflector comprising overlapping louvers providing openings therebetween through which air is drawn by an air blast passing across said deflector; a vertical drive shaft extending through the apex of said deflector; a fan mounted on the upper end of said shaft; means for driving said shaft so as to rotate said fan in a direction to deliver a blast of air downwardly against said deflector, a spray disposed in the path of said air blast; and means for delivering moisture at a suitable temperature to said spray.

26. In a temperature moderator of the class described, the combination of: a structure; a conical deflector mounted upon said structure, said deflector comprising overlapping louvers, providing opening therebetween through which air is drawn by an air blast passing across said deflector; a vertical drive shaft extending through the apex of said deflector; a fan mounted on the upper end of said shaft; means for driving said shaft so as to rotate said fan in a direction to deliver a blast of air downwardly against said deflector; a spray disposed in the path of said air blast; means for delivering moisture at a suitable temperature to said spray; and outstanding vanes on said deflector for diverting the flow of air in a manner to control the distribution thereof.

27. In a temperature moderator of the class described, the combination of: a means for producing a downward flow of air at a central point; and deflectors for diverting said downward flow into a horizontal flow, said deflectors being shaped to give a designated flow of air in each direction.

28. In a temperature moderator of the class described, the combination of: a fan for producing a flow of air; and a distributor for delivering said flow of air in a flat blanket layer beneath the trees of an orchard.

In testimony whereof, I have hereunto set my hand at Los Angeles, California, this 11th day of July, 1922.

WALDO D. WATERMAN.